United States Patent
Just

(10) Patent No.: US 7,373,512 B1
(45) Date of Patent: May 13, 2008

(54) METHOD AND APPARATUS FOR PROVIDING INFORMATION SECURITY TO PREVENT DIGITAL SIGNATURE FORGERY

(75) Inventor: Michael K. Just, Ottawa (CA)

(73) Assignee: Entrust Limited, Ottawa, Ontario (CA)

( * ) Notice: Subject to any disclaimer, the term of this patent is extended or adjusted under 35 U.S.C. 154(b) by 0 days.

(21) Appl. No.: 09/536,053

(22) Filed: Mar. 27, 2000

(51) Int. Cl.
   *H04L 9/00* (2006.01)
(52) U.S. Cl. ..................................... 713/176
(58) Field of Classification Search ................ 713/155, 713/156, 170, 168, 173, 176, 162, 175, 185; 709/206
   See application file for complete search history.

(56) References Cited

U.S. PATENT DOCUMENTS

| | | | | |
|---|---|---|---|---|
| 6,052,442 | A * | 4/2000 | Cooper et al. | 379/88.19 |
| 6,202,151 | B1 * | 3/2001 | Musgrave et al. | 713/186 |
| 6,292,897 | B1 * | 9/2001 | Gennaro et al. | 713/175 |
| 6,367,013 | B1 * | 4/2002 | Bisbee et al. | 713/178 |
| 6,757,827 | B1 * | 6/2004 | Geist | 713/176 |
| 6,763,370 | B1 * | 7/2004 | Schmeidler et al. | 709/203 |
| 2002/0019941 | A1 * | 2/2002 | Chan et al. | 713/185 |
| 2002/0138729 | A1 * | 9/2002 | Miettinen et al. | 713/173 |
| 2003/0078058 | A1 * | 4/2003 | Vatanen et al. | 455/466 |

* cited by examiner

*Primary Examiner*—Kambiz Zand
*Assistant Examiner*—Aubrey H Wyszynski
(74) *Attorney, Agent, or Firm*—Vedder Price P.C.

(57) ABSTRACT

A method and apparatus utilizes a digital signature verification map containing a plurality of acceptable message header identifiers associated with a public key certificate identifier. In one embodiment, a method includes determining a digital signature verification error based on a received message header, such as transport header identifier associated with a public key certificate identifier, such as the subject field of the certificate. The method includes generating a signature verification map or updating a signature verification map containing a plurality of acceptable message header identifiers associated with the common public key certificate identifier in response to determining the digital signature verification error. Accordingly, a link is provided between a transport header and a digitally signed message. A digital signature verification map is continually updated to accommodate aliases to a common subject associated with the certificate. The digital signature verification map is preferably digitally signed to maintain a trusted verification map to operate as part of a secure communication system. If desired, a trusted alias map may also be used.

41 Claims, 4 Drawing Sheets

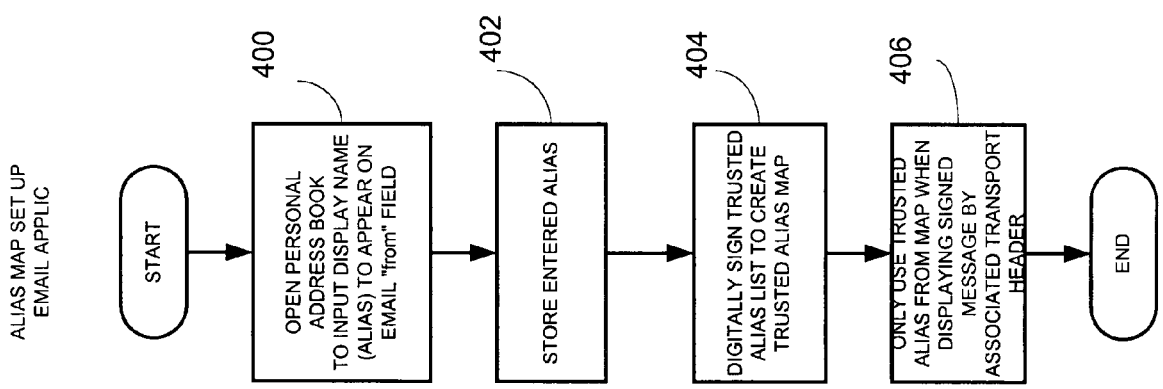

METHOD AND APPARATUS FOR PROVIDING INFORMATION SECURITY TO PREVENT DIGITAL SIGNATURE FORGERY

FIELD OF THE INVENTION

The invention relates generally to methods and apparatus for providing information security and more particularly to methods and apparatus that attempt to prevent the forging of communications within a communication system.

BACKGROUND OF THE INVENTION

With the increased use of wireless and non-wireless communications networks, such as the Internet, cellular communications systems and other communication systems, information security is becoming increasingly important. With e-mails or other communications, the forging of e-mail messages can result in enormous legal and financial losses. Information security systems, such as public key-based security systems, employ encryption and digital signing techniques as known in the art to facilitate information security among software applications, or other entities. Using digital signature algorithms, an e-mail message may be signed by a sender. Typically as part of a message, a transport header includes fields indicating from whom the message came, to whom the message is intended, and further routing information. For example, a domain name subject (i.e., the data in the "from" field) may be interpreted as the initiator of a message. A public key infrastructure can automatically verify a digital signature that is attached as part of the message body.

A problem arises when an attacker, such as an attacker that is part of a trusted system, such as a system using certificates and cryptographic keys, changes a transport header indicating that a message is coming from a different source. For example, an insider attack can occur where an attacker and a recipient have exchanged certificates. The attacker's system can construct a fake signed body by modifying a transport header so that a recipient thinks the message came from a party listed in the "from" field in the transport header since there may be no cryptographic binding between the transport header and the message body that has been encrypted and/or digitally signed.

Internet RFC 2632 entitled "S/MIME Version 3 Certificate Handling" proposes an option where certificates use fields such as a certificate subject field and a subject alternate name field so that a subject can use an alias to index an e-mail address. For example, if there is a specific e-mail address, the receiving agent checks to see if the e-mail address in the certificate from the secured body in either the subject field or alternate name field matches the sender's e-mail address in the transport header. If the e-mail addresses do not match, a message may be displayed indicating a potential security problem.

A problem with such a solution occurs when the header e-mail address is close to the cryptographic body address but does not exactly match. For example, if a sender uses two e-mail addresses such as Joe Public @ e-mail and Joseph Public @ e-mail, these two e-mail addresses may be associated with the same person. An administrator may issue a certificate with a subject field that does not match the e-mail address identically. Accordingly, the subject field in the certificate may differ slightly from the e-mail address in the transport header. The proposed Internet draft suggests that a user can accept the message as authentic each time it is validated since he can override the rejection at each such occasion where the mismatch is detected forcing an unnecessary burden on the user. In a popular implementation of RFC 2632, the user is given the option of turning off the mismatch warning. However, overriding this warning requires that all instances on all received e-mails be overridden so that the system may not detect an attack if it is selected to override the detected discrepancy.

An alternative solution would be to issue a new certificate replacing or appending the correct e-mail address. However, issuing new certificates can be onerous particularly where hundreds of thousands of users are members of a trusted community. In addition, users may have use of a plurality of email addresses so that a certificate may need to be reissued, each time a user obtains a new email address for themselves.

In addition, another problem can arise even after a message is successfully validated and displayed from a "friendly name" such as "Joe" corresponding to the email address in the transport header. There is a possibility that the friendly name can be mapped to appear to come from another source by changing an e-mail address associated with, for example, the name in an address book program. For example, the address book program may have mapped Joe Public @ email to the friendly name Joe, to provide an alias mapping of "Joe" to the email address. If Joe were to be able to alter this mapping to the friendly name (i.e., alias) Vice President, then the recipient of such a message sent and signed by Joe, would be lead to believe that the message actually came from Vice President.

Accordingly, there exists a need for a method and apparatus for providing information security to thwart forging of communicated information.

BRIEF DESCRIPTION OF THE DRAWINGS

FIG. 4 is a flow chart illustrating an alias map setup process in accordance with one embodiment of the invention.

DETAILED DESCRIPTION OF THE PREFERRED EMBODIMENT

Briefly, a method and apparatus utilizes a digital signature verification map containing a plurality of acceptable message header identifiers associated with a public key certificate identifier. In one embodiment, a method includes determining a digital signature verification error based on a received message header, such as transport header identifier associated with a public key certificate identifier, such as the subject field of the certificate. The method includes generating a signature verification map or updating a signature verification map containing a plurality of acceptable message header identifiers associated with the common public key certificate identifier in response to determining the digital signature verification error. Accordingly, a link is provided between a transport header and a digitally signed message. A digital signature verification map is continually updated to accommodate aliases to a common subject associated with the certificate. The digital signature verification map is preferably digitally signed using any suitable public key-based digital signing technique, or any suitable non-public key-based digital signing technique, as known in the art, to maintain a trusted verification map to operate as part of a secure communication system. The digital signature verification map is generated by mapping a plurality of acceptable message header identifiers on a per certificate subject identification data basis.

In addition, if desired, the method and apparatus generates a trusted alias map containing a plurality of acceptable message identifiers and at least one associated subject alias ("friendly name"). At least one of the subject aliases of the trusted alias map is displayed in response to verifying digital signatures associated with the public key certificate identifier. The trusted alias map is preferably digitally signed so that any aliases that are used come from a trusted source.

Figure 1:
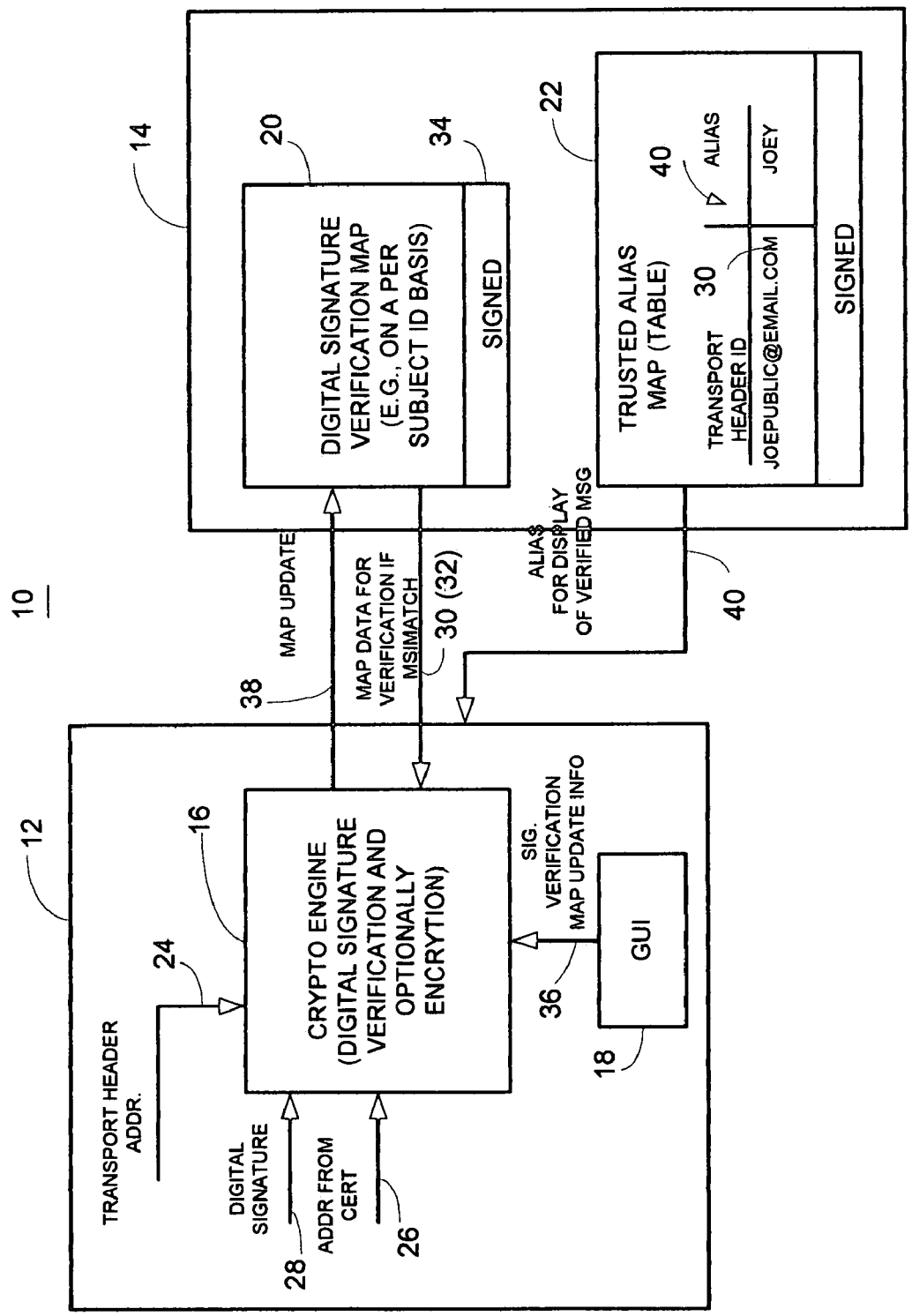
FIG. 1 is a block diagram illustrating one example of an apparatus for providing information security in accordance with one embodiment of the invention.

FIG. 1 illustrates an apparatus 10 for providing information security to prevent digital signature forgery. The apparatus 10 includes a processing module 12 and memory 14. The processing module 12 includes a cryptographic engine 16 and a user interface, such as a graphic user interface 18. The processing module 12 may be any suitable processing device, such as, but not limited to, a computer, handheld Internet appliance, smart card or any other suitable processing module. The memory 14 contains a digital signature verification map 20 and/or a trusted alias map 22.

The processing module 12 receives a message containing a message header identifier and a public key certificate identifier. For example, if the message were an e-mail message, the message header identifier may be, for example, an e-mail address or other suitable identifier in the "from" field as part of the message header or transport header. The sender identified by the message header identifier has a public key certificate containing a public key certificate identifier, such as a separate field such as in an X.509 type certificate or any other suitable digitally signed data structure. In this example, the transport header address or message header identifier 24 is in the form of an e-mail address, such as Joe Public @ e-mail.com. The message header identifier may include, for example, data representing an e-mail address of a sender, a telephone number of a sender, an identifier such as a serial number of a particular unit or other identifier associated with a sending unit, or any other suitable identifying information. The processing module 12 determines a digital signature verification error based on the received message header identifier and the public key certificate identifier 26. The public key certificate identifier may be, for example, the sender's e-mail address or any subject's identification information from a cryptographic certificate. The cryptographic engine 16 also receives in addition to the transport header identification, and the public key certificate identifier, the digital signature associated with the protected message body, as well as the verification certificate of the purported originator and any additional information required to verify the correctness of the signature as known in the art, indicated as 28. The processing module 12 generates the digital signature verification map 20 which contains a plurality of acceptable message header identifiers associated with the public key certificate identifier 26 on a per public key certificate basis. The memory 14 contains the digital signature verification map 20.

Figure 2:
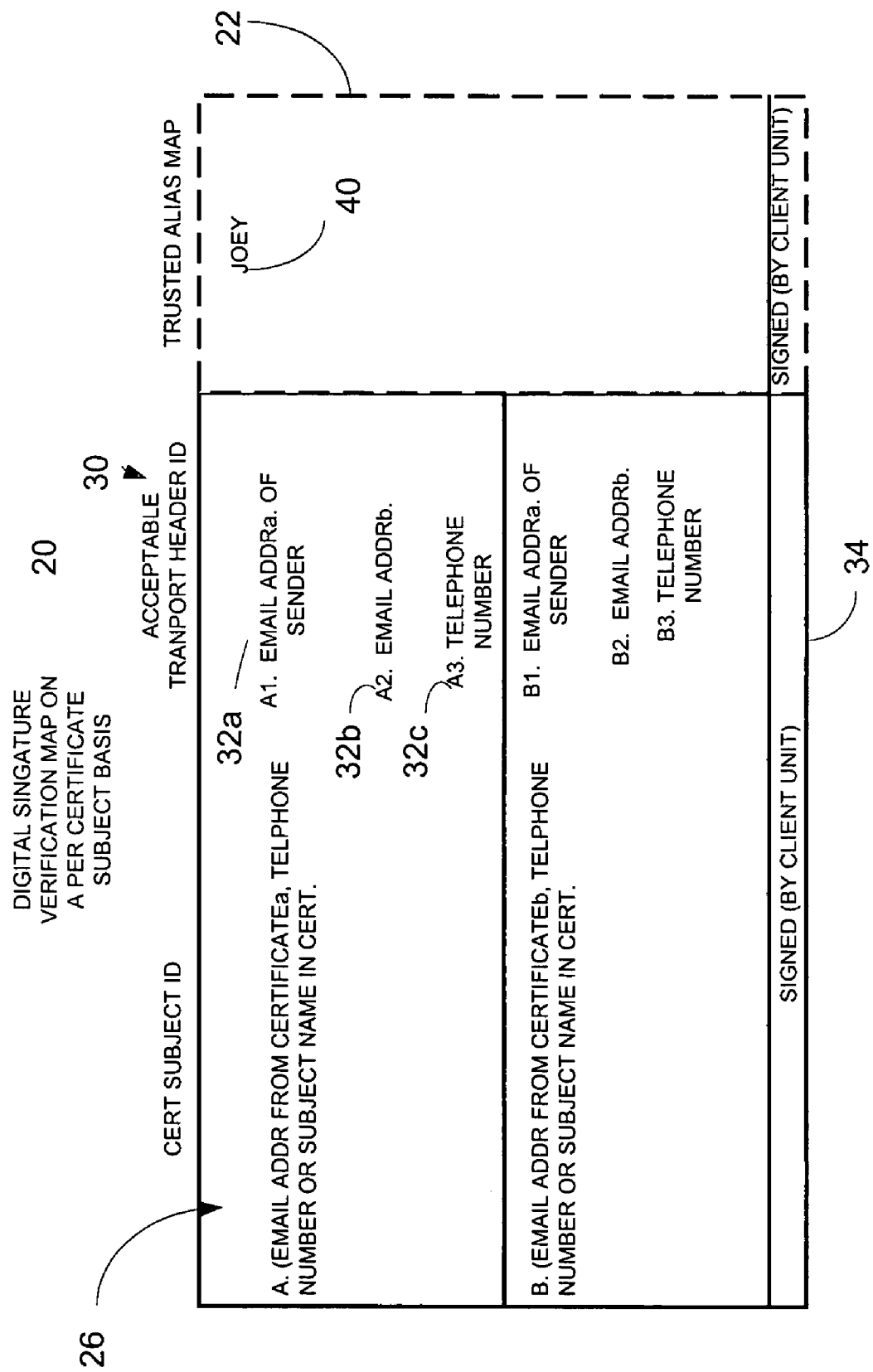
FIG. 2 is a diagram illustrating a digital signature verification map in accordance with one embodiment of the present invention.

Referring now to FIG. 2, the digital signature verification map 20 stores acceptable message header identifiers 30 as digital signature verification map entries. As shown, the processing module 12 maps the plurality of acceptable message header identifiers 30 on a per certificate subject identification basis. In this example, the certificate identifier, such as an e-mail address from a subject identifier field in certificate, is associated with three acceptable transport header ID's indicated as 32a, 32b and 32c. The digital signature verification map 20 is signed by a client unit such as the processing module 12 by using suitable public key signature technique as known in the art to provide the digital signature 34 to create a trusted digital signature verification map.

The processing module 12 updates the digital signature verification map 20 with the acceptable message header identifier 30 based on the received message header identifier 24 based on signature verification map update information 36. For example, a graphic user interface input from a user may indicate to accept a mismatch between the message header identifier 24 received in a message and the public key certificate identifier 26 (certificate subject ID information) associated with the certificate used to verify the signed message body. If a mismatch is acceptable, for example, the cryptographic engine 16 generates map update information 38 such as the new acceptable transport header ID as acceptable transport header ID to store in a digital signature verification map associated with the certificate subject ID information.

To determine whether an incoming message is authentic, once the digital signature verification map 20 has been generated, a comparison is made between the received message header ID 24 and the public key certificate identifier to see if they are exactly the same. If not, a mismatch is detected. The acceptable transport header ID 30 is sent for comparison if a mismatch is detected to determine whether the mismatch is acceptable. Accordingly, the cryptographic engine compares the incoming transport header ID data 24 with stored acceptable transport header identification data 32a-32c to see if the incoming message header ID 24 matches any of the stored digital verification map information, namely the data 32a-32c. If so, the message is accepted as authentic. If not, the user is asked whether it wishes to override and generate the map update information 38 to update the verification map 20. Accordingly, the cryptographic engine 16 verifies a digital signature 28 associated with incoming information based on the digital signature verification map 20. The processing module 12 periodically digitally signs the digital signature verification map 20 to provide a trusted digital signature verification map. This may be done by any conventional digital signature techniques as known in the art.

If desired, the processing module also generates the trusted alias map 22 which contains a plurality of acceptable message header identifiers and at least one subject alias 40. The processing module 12 displays the subject alias 40 in, for example, the "from field" in response to verifying a digital signature 28 associated with the public key certificate identifier 26 received as part of the incoming message.

In an alternative embodiment, the trusted alias map 22 may be used without the digital signature verification map. For example, during set up of an email system for a network, each user may have a trusted alias map that may be received from a trusted authority. The trusted alias map may have a trusted alias for each potential sender of messages. The alias may be entered through an "address book" operation or any suitable operation. After initial set up, the alias map may be digitally signed by the recipient's crypto engine, using any suitable signing algorithm (e.g., RSA, DSA, ECDSA, or non-public key signing technique, etc.) to provide a trusted alias map. The signing may occur each time the alias map is altered. In response to receiving a message, the processor 14 verifies the digital signature on the trusted alias map using conventional verification techniques and determines whether the email address in the message corresponds to a trusted alias. If so, the alias is displayed to the user.

The processing module 12 determines a digital signature verification error by verifying the digital signature 28 based on the verification key, as obtained from the certificate from the message. If verification is successful, the processing module 12 compares the public key certificate identifier 26 with the received message header identifier 24 to determine if a mismatch is detected. If a mismatch is detected, the processing module generates a mismatch notification through GUI 18 for an operator. The operator may then generate the signature verification map update information 36 to indicate that the mismatch is acceptable or the user may indicate it is not acceptable and will not trust the message. In addition, the trusted alias map 22 may also be digitally signed by the processing module 12 to provide a trusted alias map.

Figure 3:
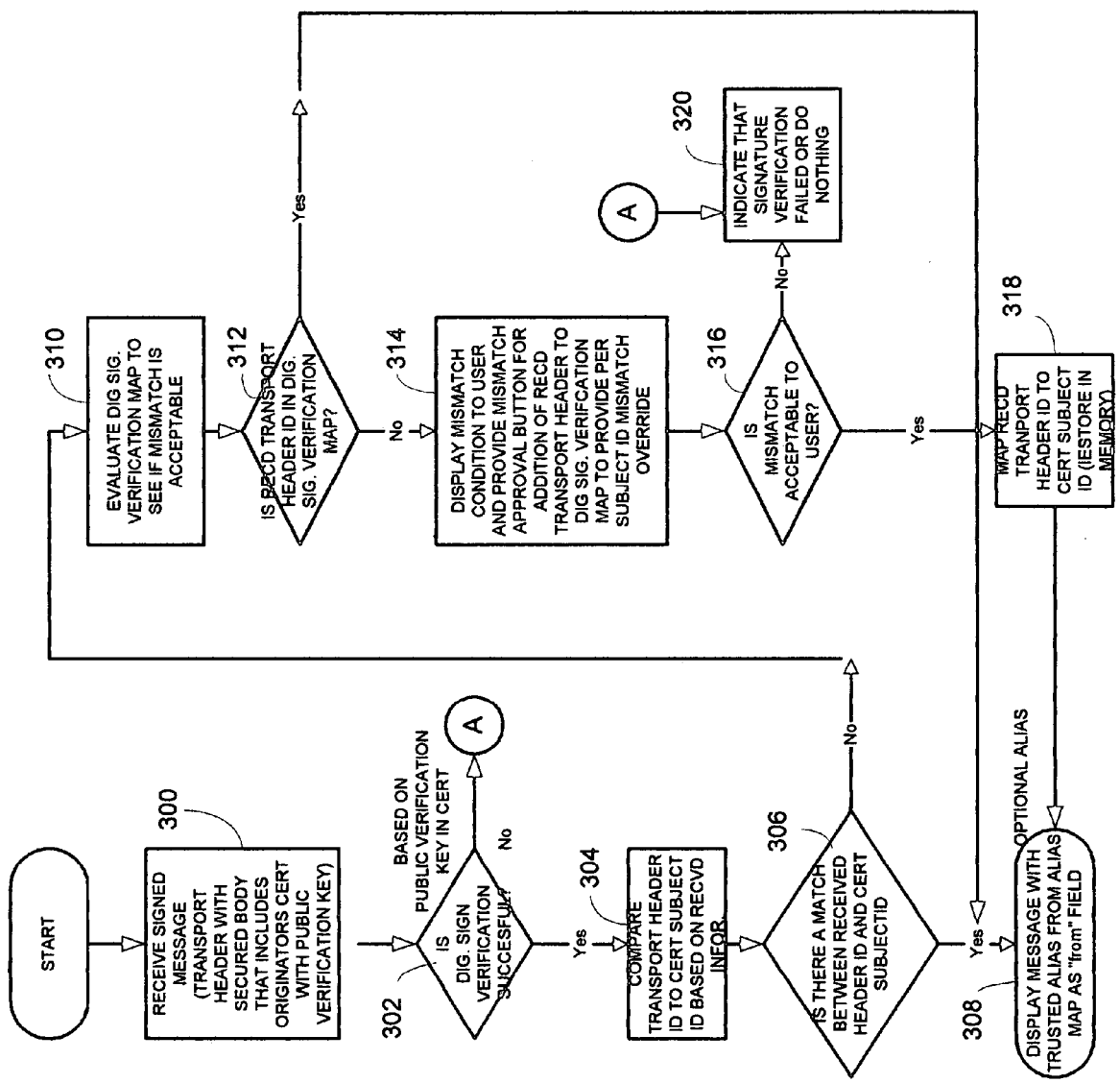
FIG. 3 is a flow chart illustrating one example of a method for providing information security in accordance with one embodiment of the invention.

FIG. 3 illustrates a flow chart of one example of a method for providing information security. In block 300, the method includes receiving a digitally signed message. For example, the signed message includes the transport header with a secured body that includes an originator's public key certificate with the public signing key (signature verification key). As shown in block 302, the method includes determining whether the digital signature on the secured body can be suitably verified using conventional public key based digital signature verification techniques. It will be recognized that this step may also be performed later such as after block 306. As shown in block 304, if the digital signature verification is successful, the method includes determining a digital signature verification error based on the received message header identifier 24 that is associated with the public key certificate identifier 26. For example, the method includes comparing the transport header ID 24 to the public key certificate subject identifier 26 in the certificate. As shown in block 306, the method includes determining if there is a match between the received message header ID and the public key certificate subject identifier 26. If there is a match, the method includes, as shown in block 308, displaying the message with a trusted alias from the trusted alias map. For example, the method includes displaying a "to" field with a recipient identifier, and a "from" field which contains a trusted alias map entry from the trusted alias map. The process then continues to evaluate the received message.

Referring back to block 306, if there is a mismatch between the received message header ID 24 and certificate subject ID 26 by comparing the public key certificate identifier 26 with the message header identifier 24 to determine if there is a mismatch, the process includes, as shown in block 310, evaluating the digital signature verification map 20 to see if the mismatch is acceptable. For example, the processor 12 searches the digital signature verification map 20 for the transport header identifier entries associated with the certificate subject ID obtained from the public key certificate. If it appears in the digital signature verification map, as shown in block 312, the process includes displaying the message with the acceptable transport header ID received in the message. Optionally, if a trusted alias map is provided, a trusted alias entry may be displayed as indexed by the acceptable transport header ID.

However, if the received transport header ID 24 is not in the digital signature verification map, or if the digital signature verification map 20 does not yet exist, the method includes generating the digital signature verification map 20 containing a plurality of acceptable message header identifiers 32a associated with a public key certificate identifier. For example, as shown in block 314, the method includes displaying the mismatch condition to a user on suitable display device and providing a mismatch approval selector, such as a GUI button or any other suitable selection mechanism to add the received transport header ID from the message to create the digital signature verification map to provide a per subject ID mismatch override for this transport header identifier and certificate subject identifier pair for all such subsequent messages. Accordingly, the process includes determining whether the mismatch is acceptable to a user as shown in block 316. If so, the method includes storing the acceptable message header identifier 32a as a digital signature verification map entry in response to determining the digital signature verification error. As shown in block 318, the method includes mapping the plurality of acceptable message header identifiers 32a-32c on a per certificate subject identification data basis in memory to update or initially generate the digital signature verification map 20. If the trusted alias map 22 is generated, the method includes displaying the message with the trusted alias, as opposed to the received message header ID in the "from" field, for the user. The mismatch approval selection data serves as digital signature verification map update data which allows updating of a pre-existing digital signature verification map, or initial creation of a digital signature verification map based on the received message header ID. If the new transport header ID is selected as being acceptable, the method includes verifying the digital signature in the message obtained with received message information based on the digital signature verification map by using the accepted transport header ID as a trusted sender. As shown in block 320, if the mismatch is not acceptable for the user as indicated by the mismatch approval button, the process includes indicating that the digital signature verification failed, or providing other feedback to the user, if desired. The message header identifier may include, but is not limited to, the e-mail address of a sender, telephone number of a sender, and identifier associated with a sender, such as a serial number of the sending unit, or any other suitable information.

In addition, as part of generation or updating of the digital verification map, the processor may digitally sign the digital signature verification map to provide a trusted digital signature verification map after each update or upon creation. This provides an additional level of security so that digital signature verification map cannot be readily compromised with an attack.

FIG. 4 illustrates one example of a method for generating a trusted alias map. As shown in block 400, the process includes generating a trusted alias map containing a plurality of acceptable message identifiers as indicated, for example, in the digital signature verification map, and at least one associated subject alias that is associated with the acceptable message identifiers for a given transport header ID. For example, where the processor includes a personal address book that may be a Windows-based address book that allows a user to enter an e-mail address and the associated alias, the method includes opening the personal address book to input an alias associated with an e-mail address or other identifier box, such as an alias that would appear on an e-mail in the "from" field. The process includes storing the entered alias as shown in block 402. As shown in block 404, the method includes digitally signing the alias list to create a trusted alias map. The processor 12 digitally signs the stored entered alias associated with the given transport header ID using any suitable public key-based digital signature signing technique, or any suitable non-public key digital signing technique, as known in the art. As shown in block 406, the method includes displaying at least one subject alias from the trusted alias map in response to verifying a digital signature associated with public key certificate identifier received in the message. This is done by processor 12 obtaining from the trusted alias map the entered alias associated with the transport header ID that has been accepted. Accordingly, the method includes using only the trusted alias from the trusted alias map when displaying a signed message by an associated transport header. The process then continues to allow a user or operator to update a personal address book or any other trusted alias map input mechanism that allows the entry of aliases for associated acceptable transport header IDs.

The foregoing method and apparatus for providing information security may be implemented using executable instructions that are stored on a suitable storage medium. For example, the processor 12 may be suitably controlled by executable instructions contained in memory wherein the memory contains executable instructions that when read by one or more processing units causes one or more processing units to perform the aforedescribed operations. The storage medium may be any suitable storage medium including, but not limited to, RAM, ROM, optical storage mediums, distributed memory such as network storage devices, Internet accessible storage memory, or any other suitable storage medium.

It should be understood that the implementation of other variations and modifications of the invention in its various aspects will be apparent to those of ordinary skill in the art, and that the invention is not limited by the specific embodiments described. For example, the disclosed operations may be performed in any suitable order. It is therefore contemplated to cover by the present invention, any and all modifications, variations, or equivalents that fall within the spirit and scope of the basic underlying principles disclosed and claimed herein.

What is claimed is:

1. A method for providing information security comprising the steps of:
   determining a digital signature verification error based on a received message header identifier associated with a public key certificate identifier; and
   in response to a determined digital signature verification error, generating a digital signature verification map containing a plurality of acceptable message header identifiers associated with the public key certificate identifier.

2. The method of claim 1 wherein the step of generating the digital signature verification map includes storing at least one acceptable message header identifier as a digital signature verification map entry in response to determining the digital signature verification error.

3. The method of claim 1 wherein the step of generating the digital signature verification map includes mapping the plurality of acceptable message header identifiers on a per certificate subject identification data basis.

4. The method of claim 1 including the step of verifying a digital signature associated with received message information based on the digital signature verification map.

5. The method of claim 1 including the step of receiving digital signature verification map update data and updating the digital signature verification map with at least one acceptable message header identifier based on a received message header ID.

6. The method of claim 5 wherein the digital signature verification map update data is based on user input data.

7. The method of claim 1 wherein the message header identifier includes at least one of data representing an email address of a sender, a telephone number of a sender and an identifier associated with a sending unit.

8. The method of claim 1 including the step of digitally signing the digital signature verification map to provide a trusted digital signature verification map.

9. The method of claim 1 wherein the step of determining a digital signature verification error includes the steps of:
   comparing the public key certificate identifier with the message header identifier to determine if a mismatch is detected;
   if a mismatch is detected, generating a mismatch notification for an operator; and
   verifying a digital signature based on a verification key associated with the public key certificate identifier.

10. The method of claim 1 comprising continually updating the digital signature verification map to include aliases to a common subject associated with the certificate.

11. The method of claim 1 comprising verifying a subsequent message based on the digital signature verification map, and wherein the received message header identifier is added to the digital signature verification map if it caused a digital signature verification error.

12. A method for providing information security comprising the steps of:
   determining a digital signature verification error based on a received message header identifier associated with a public key certificate identifier;
   generating a digital signature verification map containing a plurality of acceptable message header identifiers associated with the public key certificate identifier by storing at least one acceptable message header identifier as a digital signature verification map entry in response to determining the digital signature verification error; and
   verifying a digital signature associated with received message information based on the digital signature verification map.

13. The method of claim 12 wherein the step of determining a digital signature verification error includes the steps of:
   comparing the public key certificate identifier with the message header identifier to determine if a mismatch is detected;
   if a mismatch is detected, generating a mismatch notification for an operator; and
   verifying a digital signature based on a verification key associated with the public key certificate identifier.

14. The method of claim 13 including the step of receiving digital signature verification map update data and updating the digital signature verification map with at least one acceptable message header identifier based on a received message header ID.

15. The method of claim 14 including the step of digitally signing the digital signature verification map to provide a trusted digital signature verification map.

16. The method of claim 12 wherein the step of generating the digital signature verification map includes mapping the plurality of acceptable message header identifiers on a per certificate subject identification data basis.

17. The method of claim 12 wherein at least one of the plurality of message header identifiers includes at least one of data representing an email address of a sender, a telephone number of a sender and an identifier associated with a sending unit.

18. A method for providing information security comprising the steps of:
   determining a digital signature verification error based on a received message header identifier associated with a public key certificate identifier; and
   in response to a determined digital signature verification error, updating a digital signature verification map to add an acceptable message header identifier associated with the public key certificate identifier.

19. The method of claim 18 including the step of verifying a digital signature associated with received message information based on the digital signature verification map.

20. The method of claim 18 wherein the step of determining a digital signature verification error includes the steps of:
   comparing the public key certificate identifier with the message header identifier to determine if a mismatch is detected;
   if a mismatch is detected, generating a mismatch notification for an operator; and
   verifying a digital signature based on a verification key associated with the public key certificate identifier.

21. An apparatus for providing information security comprising:
   a processing module operative to determine a digital signature verification error based on a received message header identifier associated with a public key certificate identifier; and operative to generate a digital signature verification map containing a plurality of acceptable message header identifiers associated with the public key certificate identifier in response to a determined digital signature verification error; and
memory, operatively coupled to the processing module, containing the digital signature verification map.

22. The apparatus of claim 21 wherein the memory stores at least one acceptable message header identifier as a digital signature verification map entry.

23. The apparatus of claim 21 wherein the processing module maps the plurality of acceptable message header identifiers on a per certificate subject identification data basis.

24. The apparatus of claim 21 wherein the processing module includes a cryptographic engine operative to verify a digital signature associated with received message information based on the digital signature verification map.

25. The apparatus of claim 21 wherein the processing module updates the digital signature verification map with at least one acceptable message header identifier based on a received message header ID.

26. The apparatus of claim 21 wherein the message header identifier includes at least one of data representing an email address of a sender, a telephone number of a sender and an identifier associated with a sending unit.

27. The apparatus of claim 21 wherein the processing module digitally signs the digital signature verification map to provide a trusted digital signature verification map.

28. The apparatus of claim 21 wherein the processing module determines a digital signature verification error by comparing the public key certificate identifier with the message header identifier to determine if a mismatch is detected; if a mismatch is detected, generating a mismatch notification for an operator; and
   verifying a digital signature based on a verification key associated with the public key certificate identifier.

29. A storage medium comprising:
   memory containing executable instructions that when read by one or more processing units causes one or more processing units to:
   determine a digital signature verification error based on a received message header identifier associated with a public key certificate identifier; and
   in response to a determined digital signature verification error, generate a digital signature verification map containing a plurality of acceptable message header identifiers associated with the public key certificate identifier.

30. The storage medium of claim 29 wherein the memory contains executable instructions that cause the one or more processing units to generate the digital signature verification map by storing at least one acceptable message header identifier as a digital signature verification map entry in response to determining the digital signature verification error.

31. The storage medium of claim 29 wherein the memory contains executable instructions that cause the one or more processing units to map the plurality of acceptable message header identifiers on a per certificate subject identification data basis.

32. The storage medium of claim 29 wherein the memory contains executable instructions that cause the one or more processing units to verify a digital signature associated with received message information based on the digital signature verification map.

33. The storage medium of claim 29 wherein the memory contains executable instructions that cause the one or more processing units to receive digital signature verification map update data and update the digital signature verification map with at least one acceptable message header identifier based on a received message header ID.

34. The storage medium of claim 29 wherein the message header identifier includes at least one of data representing an email address of a sender, a telephone number of a sender and an identifier associated with a sending unit.

35. The storage medium of claim 29 wherein the memory contains executable instructions that cause the one or more processing units to digitally sign the digital signature verification map to provide a trusted digital signature verification map.

36. The storage medium of claim 29 wherein the memory contains executable instructions that cause the one or more processing units to determine a digital signature verification error by:
   verifying a digital signature based on a verification key associated with the public key certificate identifier;
   if verification is successful, comparing the public key certificate identifier with the message header identifier to determine if a mismatch is detected; and
   if a mismatch is detected, generating a mismatch notification for an operator.

37. A method for providing information security comprising the steps of:
   determining a digital signature verification error based on a received message header identifier associated with a public key certificate identifier;
   generating a digital signature verification map containing a plurality of acceptable message header identifiers associated with the public key certificate identifier;
   generating a trusted alias map containing the plurality of acceptable message identifiers and at least one associated subject alias; and displaying the at least one subject alias in response to verifying a digital signature associated with the public key certificate identifier.

38. A method for providing information security comprising the steps of:
- determining a digital signature verification error based on a received message header identifier associated with a public key certificate identifier;
- generating a digital signature verification map containing a plurality of acceptable message header identifiers associated with the public key certificate identifier by storing at least one acceptable message header identifier as a digital signature verification map entry in response to determining the digital signature verification error;

verifying a digital signature associated with received message information based on the digital signature verification map;
- generating a trusted alias map containing the plurality of acceptable message identifiers and at least one associated subject alias; and
- displaying the at least one subject alias in response to verifying a digital signature associated with the public key certificate identifier.

39. An apparatus for providing information security comprising:
- a processing module operative to determine a digital signature verification error based on a received message header identifier associated with a public key certificate identifier; and operative to generate a digital signature verification map containing a plurality of acceptable message header identifiers associated with the public key certificate identifier; memory, operatively coupled to the processing module, containing the digital signature verification map; and
- wherein the processing module generates a trusted alias map containing the plurality of acceptable message identifiers and at least one associated subject alias, and displays the at least one subject alias in response to verifying a digital signature associated with the public key certificate identifier.

40. A storage medium comprising:
memory containing executable instructions that when read by one or more processing units causes one or more processing units to:
- determine a digital signature verification error based on a received message header identifier associated with a public key certificate identifier; and
- generate a digital signature verification map containing a plurality of acceptable message header identifiers associated with the public key certificate identifier; and
- wherein the memory contains executable instructions that cause the one or more processing units to digitally sign the digital signature verification map to provide a trusted digital signature verification map.

41. A method for providing information security comprising the steps of:
- generating a trusted alias map containing the plurality of acceptable message identifiers and at least one associated subject alias;
- displaying the at least one subject alias in response to verifying a digital signature associated with a public key certificate identifier; and
- wherein the step of generating the trusted alias map includes digitally signing the trusted alias map, and wherein the method includes the step of verifying trusted alias map digital signature prior to displaying the at least one subject alias.

* * * * *